United States Patent [19]
Dent et al.

[11] Patent Number: 5,282,250
[45] Date of Patent: Jan. 25, 1994

[54] METHOD OF CARRYING OUT AN AUTHENTICATION CHECK BETWEEN A BASE STATION AND A MOBILE STATION IN A MOBILE RADIO SYSTEM

[75] Inventors: Paul W. Dent, Stehag; Alex K. Raith, Kista; Jan E. S. Dahlin, Järfälla, all of Sweden

[73] Assignee: Telefonaktiebolaget L M Ericsson, Stockholm, Sweden

[21] Appl. No.: 68,234

[22] Filed: May 27, 1993

Related U.S. Application Data

[63] Continuation of Ser. No. 655,771, Feb. 15, 1991, abandoned.

[30] Foreign Application Priority Data

Mar. 9, 1990 [SE] Sweden .............................. 9000856-6

[51] Int. Cl.⁵ .............................................. H04L 9/32
[52] U.S. Cl. ........................................ 380/23; 380/49; 340/825.31; 340/825.34; 379/59; 379/62; 379/63; 379/95; 455/33.1; 455/54.1; 455/54.2
[58] Field of Search ................. 340/825.31, 825.34; 379/59, 62, 63, 95; 455/33.1, 34.1, 34.2, 54.1, 54.2, 56.1

[56] References Cited

U.S. PATENT DOCUMENTS

| | | | |
|---|---|---|---|
| 4,268,715 | 5/1981 | Atalla | 380/23 |
| 4,436,957 | 3/1984 | Mazza et al. | 379/62 |
| 4,654,481 | 3/1987 | Corris et al. | 379/62 |
| 4,992,783 | 2/1991 | Zdunek et al. | 340/825.34 |
| 4,995,083 | 2/1991 | Baker et al. | 380/23 |

FOREIGN PATENT DOCUMENTS 3405381  8/1985  Fed. Rep. of Germany.
3420460 12/1985  Fed. Rep. of Germany.

OTHER PUBLICATIONS

H. Beker and Fred Piper, Cipher Systems, The Protection of Communications, 1982; pp. 305-311, 320-322.

*Primary Examiner*—Bernarr E. Gregory
*Attorney, Agent, or Firm*—Burns, Doane, Swecker & Mathis

[57] ABSTRACT

Methods for carrying out an authentication check in a mobile telephone system in which an authentic base station serves a plurality of mobile stations. A prior method carried out a unidirectional check from the base to a calling mobile, permitting a false base to carry out a false authentication check by collecting a number of so-called RAND-Response pairs. To avoid this problem, another unidirectional, base-to-mobile, authentication check and an authentication check from the mobile to the base are carried out. In one embodiment, only the bi-directional authentication check is carried out.

20 Claims, 2 Drawing Sheets

METHOD OF CARRYING OUT AN AUTHENTICATION CHECK BETWEEN A BASE STATION AND A MOBILE STATION IN A MOBILE RADIO SYSTEM

This application is a continuation of application Ser. No. 07/655,771, filed Feb. 15, 1991, now abandoned.

TECHNICAL FIELD

The present invention relates to a method of carrying out an authentication check between a base station and a mobile station in a mobile radio system, particularly in a cellular mobile telephone system. The proposed method can also be applied with other mobile radio systems, for instance paging systems.

BACKGROUND ART

In the case of a cellular mobile telephone system for instance, an authentication check is carried out before a call is set up between the mobile and the base station. The base station asks for information concerning the mobile, with respect to its identity, by ordering the mobile to send an identification number. The mobile is therewith forced to reveal its identity to the base station, so that the base station will know that the mobile is authorized to send a call over the system and so that the base station and also the exchange will know which mobile shall be charged for the call subsequently set up.

On the other hand, the mobile station must be certain that it communicates with the authentic base station, i.e. with a base station which is truly authorized to put connect a call when the mobile is the calling party (the mobile is an A-subscriber), and that the mobile station will be charged correctly for the call.

For the purpose of performing an authentication check, it is earlier known to form authentication signals, "Resp"-signals, in the base station and the mobile station. A random number (RAND) is sent from the base to mobiles within the area covered by the base station. The calling mobile answers with a given signal (Resp 1). In a similar manner, the base station forms the same signal Resp 1 from the random number and the identity of the calling mobile. These signals normally coincide and the base station orders the mobile to a speech channel.

DISCLOSURE OF THE INVENTION

Thus, in the aforesaid known method of carrying out authentication checks, there is formed a RAND-Response pair for a given mobile station, i.e. a given Response signal is formed in the mobile for a given received random number RAND, and a base station can thus receive a number of such response signals for a number of different random numbers. This means that it is possible to establish a "false" base station which is able to transmit a number of mutually different random numbers and receives a corresponding (different) number of Response signals. The false base station is therewith able to create a mobile subscription which is not authorized to send calls over the system. This drawback or deficiency of the known authentication check is due to the fact that the check is uni-directional, namely it is only the base station which requires the response signal in proof of the authentication of the mobile.

According to the present method, the authentication check is bi-directional, i.e. it is not only the base station which requires the identity of the mobile, but that the mobile also requires the identity of the base station.

The object of the present invention is thus to provide an improved authentication check method which renders impossible manipulation by a false base station with the intention of obtaining access to the authentication code of the mobile telephone system.

The inventive method is characterized by the steps set forth in the characterizing clause of claim 1. Further developments of the proposed method are set forth in depending claims 2-3.

BRIEF DESCRIPTION OF THE DRAWINGS

The invention will now be described in more detail with reference to the accompanying drawings, in which.

BEST MODE OF CARRYING OUT THE INVENTION

Figure 1:
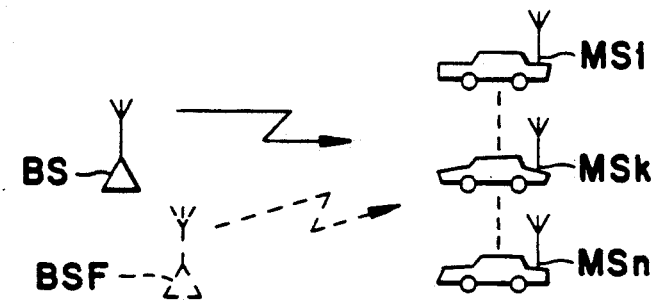
FIG. 1 illustrates schematically communication between two base stations and a plurality of mobile stations.

FIG. 1 illustrates an authentic base station BS which listens by transmitting random numbers to a plurality of mobiles MS1–MSn over a given control channel. Of these mobiles, a response is received from a mobile MSk which indicates that it wishes to establish a call over a given speech channel. As described above, a uni-directional authentication check is carried out, where the base station requires a response Resp 1 from the mobile MSk. This will be described below in more detail with reference to FIG. 2. Since the connection is unidirectional during this stage, a false base station BSF is able to obtain a response from a number of mobiles when transmitting the aforesaid random number RAND, in the aforesaid manner. The base station BSF is therewith able to create a bank of RAND-Response replies, which can then be utilized in an unauthorized manner by a mobile station.

Figure 2:
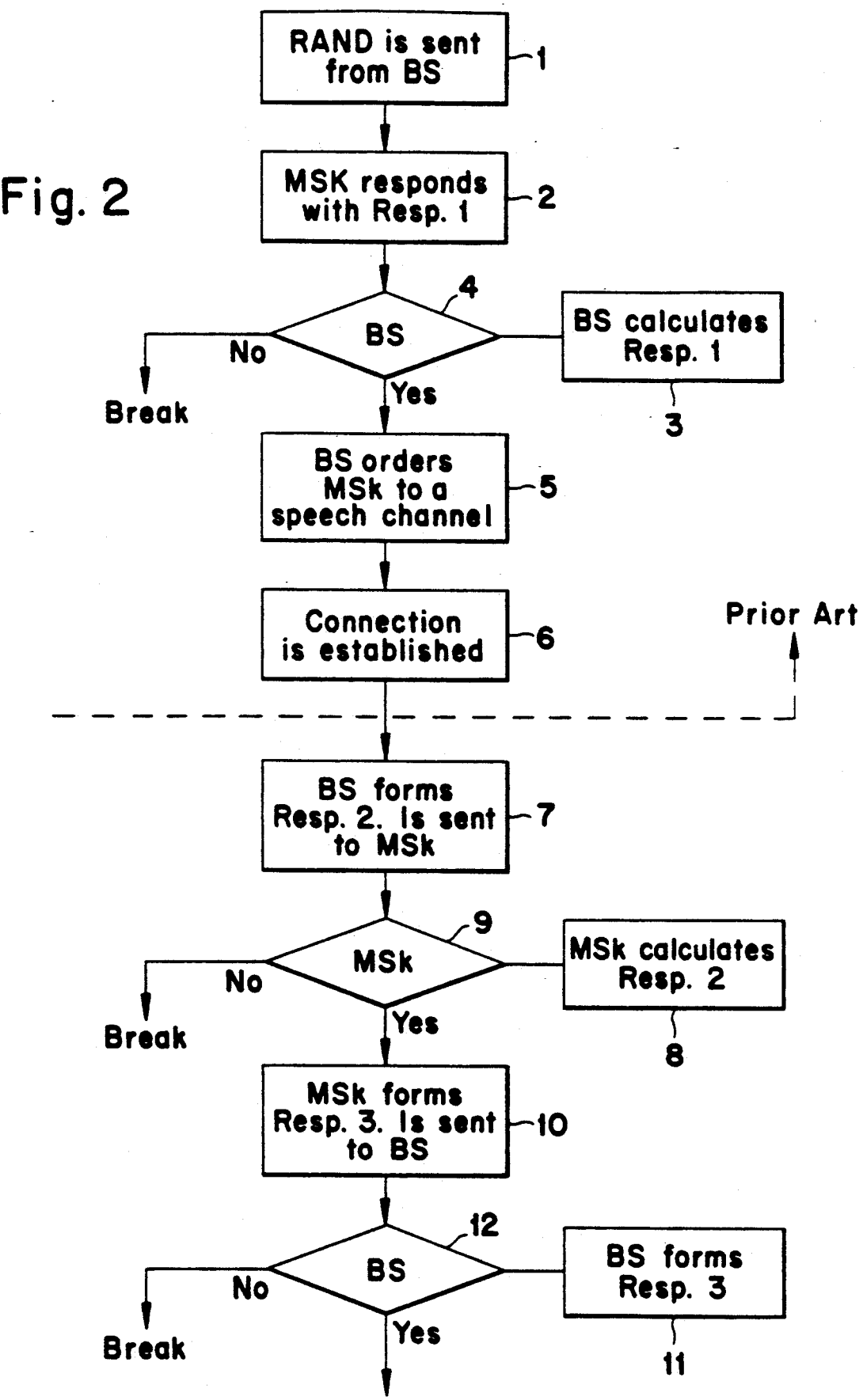
FIG. 2 is a flow sheet which illustrates one embodiment of the proposed method.

In order to make this impossible, there is proposed in accordance with the invention an authentication method disclosed in the flow chart of FIG. 2.

An authentic base station BS listens to a number of mobiles MS1–MSn within the area covered by said base station, by transmitting a random number RAND, block 1.

Figure 3:
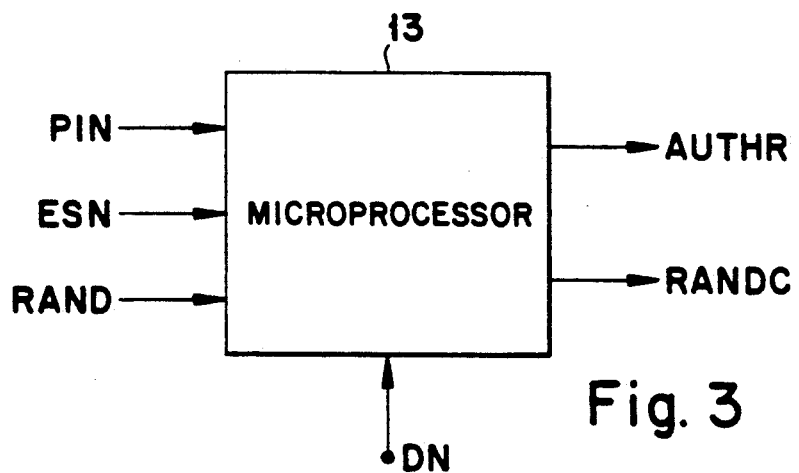
FIG. 3 is a block schematic of the input and output magnitudes of an authenticity algorithm incorporated in a mobile station.

A given mobile station MSk wishing to establish a call, answers with a signal Resp 1, block 2. This signal is formed in the microprocessor of the mobile from a number of input data PIN, ESN and DN, in addition to the random number RAND received, see FIG. 3, where PIN represents the personal identification number of the mobile, ESN represents the electronic serial number of the mobile, and DN represents the number dialled. The mobile station MSk is therewith an A-subscriber. The microprocessor 13 then delivers the Resp 1 signal, which consists of an 18-bit AUTH-signal and an 8-bit RANDC-signal, which is sent to the base station.

The base station calculates Resp 1 in a corresponding manner, block 3, from the incoming signals AUTH and RANDC and makes a comparison with the value of the Resp-signal calculated and transmitted by the mobile, block 4. When these coincide, the base station orders the mobile to a given, allocated speech channel, block 5, and the connection is established in a known manner, block 6. The aforedescribed method is previously known.

According to the proposed method, the base station now forms a response signal Resp 2 from a further random number RAND 2 and from the personal identification number PIN of the mobile, this number being known in the base station (blocks 2, 3). Both Resp 2 and RAND 2 are sent to the mobile, block 7. The mobile station forms a value of Resp 2 from its PIN and the received random number RAND 2, block 8. A comparison is now made in the mobile, block 9, between the received Resp 2 and the formed value of Resp 2. If these two values coincide, the mobile forms a value Resp 3 and sends this value to the base station, block 10. Resp 3 is formed from RAND 2 and PIN in the mobile. The base station forms Resp 3 in a similar manner from RAND 2 and PIN, which are known in the base station, block 11. A comparison is then made, block 12, between the received and formed values of Resp 3. If the values coincide, connection of the call continues to establish a speech connection.

The method steps according to block 7, 8 and 9 provide an authentication check in which the mobile decides whether or not the base station is authentic, since verification of the signal Resp 2 sent from the base station takes place in the mobile, and against a value Resp 2 calculated in said mobile. The signal Resp 2 from the base station can therefore be taken as a response signal from said station. The aforedescribed method constitutes the main difference between the proposed method and the known method according to blocks 2, 3 and 4.

The check carried out in accordance with blocks 10, 11 and 12 constitutes substantially a repetition of the method according to blocks 2, 3 and 4, i.e. a check from the base station that the mobile is authentic.

An essential difference in relation to the known authenticity method (blocks 1-4) is that the mobile also requires a response Resp 2 from the base station and verifies this response in accordance with blocks 7-9. A false base station must therefore know exactly how this response signal shall be calculated. The check is therewith bidirectional.

The authentication check according to blocks 2, 3 and 4 can be carried out on a general control channel in the mobile radio system, and the authentication check according to blocks 7-12 can be carried out on the speech channel established between the base station BS and the mobile MSk (blocks 5 and 6).

Figure 4:
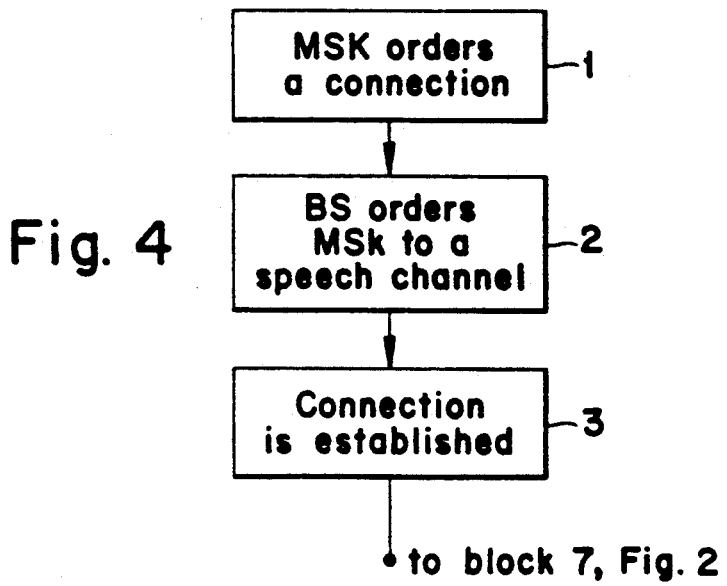
FIG. 4 is a flow sheet which illustrates another embodiment of the proposed method.

FIG. 4 is a block diagram illustrating the first method steps in the case when solely a bidirectional authentication check is carried out. In this case, the steps according to blocks 1-3 replace the steps according to blocks 1-6 in FIG. 2. In this case, no unidirectional (and known) authentication check is carried out prior to the bidirectional check. A calling mobile, for instance MSk, asks for a connection from the base station BS. When receiving this call request, the base station BS looks for a free speech channel and orders the mobile MSk to this free channel. In this way, a free connection is established over the speech channel without carrying out an authentication check. The actual authentication check is then carried out in the manner aforedescribed with reference to blocks 7-12 of FIG. 2, i.e. only a bidirectional authentication check is carried out.

We claim:

1. A method for carrying out an authentication check between a base station and a mobile station in a mobile radio system, authentication of the mobile station being established when the base station determines that the mobile station should be given service and authentication of the base station being established when the mobile station determines that it should accept service from the base station, the method comprising the steps of:

prior to establishing a connection, sending from the base station an interrogative message concerning the authentication of the mobile station;

requiring the mobile station to send a first response signal;

using the first response signal in the base station to establish the authentication of the mobile station;

subsequent to establishing the authentication of the mobile station, sending from the base station a second response signal to the mobile station;

using the second response signal in the mobile station to form a corresponding second response signal, thereby establishing the authentication of the base station; and when authentication of the base station has been established, sending from the mobile station a third response signal and using the third response signal in the base station to establish the authentication of the mobile station prior to the service connection being established.

2. A method according to claim 1, wherein said second response signal is formed from a pseudo-random number produced in the base station and from an identification number of the mobile station, and the authentication of the base station is established by comparing said second response signal with the corresponding second response signal produced in the mobile station based on the received pseudo-random number and the identification number of the mobile station.

3. A method according to claim 2, wherein said third response signal sent to the base station is formed from said pseudo-random number and from an identification number of said mobile station, and said base station forms a corresponding third response signal from said pseudo-random number and the identification number of the mobile station, and the base station compares the third response signal and the corresponding third response signal such that when agreement is found between said signals, a speech connection can be established between the base station and the mobile station.

4. A method of carrying out an authentication check between a base station and a mobile station in a mobile radio system, authentication of the mobile station being established when the base station determines that the mobile station should be given service and authentication of the base station being established when the mobile station determines that it should accept service from the base station, the method comprising the steps of:

the mobile station requesting a connection;

the base station assigning the mobile station a connection over a given channel;

forming in the base station a first response signal and sending said first response signal to the mobile station;

forming in the mobile station a corresponding response signal, thereby establishing the authentication of the base station;

subsequent to establishing the authentication of the base station, sending a second response signal from the mobile station to the base station; and forming in the base station a corresponding response signal, thereby establishing the authentication of the mobile station prior to establishing a service connection.

5. A method according to claim 4, wherein said first response signal is formed from a pseudo-random number produced in the base station and from an identification number of the mobile station, and the authentication of the base station is established by comparing said first response signal with a signal produced in the mobile station based on the received pseudo-random number and the identification number of the mobile station.

6. A method according to claim 5, wherein said second response signal sent to the base station is formed from said pseudo-random number and from an identification number of the mobile station, the base station forms a corresponding second response signal from said pseudo-random number and from the identification number of the mobile station, and the base station compares the corresponding second response signal and the second response signal and establishes a speech connection with the mobile station when the second response signal and the corresponding second response signal coincide.

7. A method for the authentication of a network and a mobile station in a mobile radio system, authentication of the mobile station being established when the network determines that the mobile station should be given service and authentication of the network being established when the mobile station determines that it should accept service from the network, the method comprising the steps of:

forming in each of the network and the mobile station first and second response signals which depend on a pseudo-random number transmitted from the network to the mobile station;

transmitting the first response signal formed in the network to the mobile station;

comparing in the mobile station the first response signal formed in the mobile station with the first response signal received from the network;

transmitting the second response signal formed in the mobile station to the network; and comparing the network the second response signal formed in the network with the second response signal received from the mobile station.

8. A method according to claim 7 wherein the first and second response signals depend on other data in addition to the pseudo-random number.

9. A method according to claim 8 wherein the other data includes a personal identification number of the mobile station.

10. A method according to claim 8 wherein the other data includes an electronic serial number of the mobile station.

11. A method according to claim 8 wherein the other data includes a number dialled from the mobile station.

12. A method according to claim 7 wherein the second response signal formed in the mobile station is transmitted to the network only if the first response signal formed in the mobile station is identical to the first response signal received from the network.

13. A method according to claim 7 further including a step of establishing voice communication between the network and the mobile station if the second response signal formed in the network is identical to the second response signal received from the mobile station.

14. A method according to claim 7 further including the step of terminating voice communication between the network and the mobile station if the second response signal formed in the network is not identical to the second response signal received from the mobile station.

15. A method for controlling call set up between a network and a mobile station within an area covered by the network, said method comprising the steps of:

sending a first pseudo-random signal from the network to the mobile station;

computing in the mobile station a first mobile value which is dependent on the first pseudo-random signal received from the network;

sending the first mobile value from the mobile station to the network;

computing in the network a first network value corresponding to the first mobile value;

comparing the first mobile value to the first network value;

allocating to the mobile station a speech channel if the first mobile value coincides with the first network value;

computing in the network a second network value which is dependent on a second pseudo-random signal;

sending the second network value and the second pseudo-random signal from the network to the mobile station;

computing in the mobile station a second mobile value corresponding to the second network value;

comparing the second network value to the second mobile value;

computing in the mobile station a third mobile value which is dependent on the second pseudo-random signal;

sending the third mobile value from the mobile station to the network; and computing in the network a third network value corresponding to the third mobile value;

comparing the third mobile value to the third network value; and setting up the call between the network and the mobile station if the third mobile value coincides with the third network value.

16. A method according to claim 15 wherein the third mobile value is computed in the mobile station and sent to the network only if the second network value coincides with the second mobile value.

17. A method according to claim 16 wherein the first pseudo-random signal and the first mobile value are sent on a control channel.

18. A method according to claim 17 wherein the second pseudo-random signal, the second network value and the third mobile value are sent on the allocated speech channel.

19. A method for carrying out an authentication check between a network and a mobile station in a mobile radio system comprising the steps of:

selecting a first pseudo-random value;

providing the first pseudo-random value to each of the network and the mobile station;

computing in each of the network and the mobile station a first authentication value from the first pseudo-random value;

sending the first authentication value computed in the mobile station to the network;

comparing the first authentication value computed in the network with the first authentication value received from the mobile station;

selecting a second pseudo-random value;

providing the second random value to each of the network and the mobile station;

computing in each of the network and the mobile station a second authentication value from the second pseudo-random value;

sending the second authentication value computed in the network to the mobile station; and comparing the second authentication value computed in the mobile station with the second authentication value received from the network.

20. A method according to claim 19 wherein the first authentication value is sent on a control channel and the second authentication value is sent on a speech channel.

* * * * *